(No Model.) 2 Sheets—Sheet 1.

J. T. WELLS.
ANIMAL TRAP.

No. 583,829. Patented June 1, 1897.

WITNESSES:

INVENTOR
J. T. Wells.
BY
ATTORNEYS.

(No Model.) 2 Sheets—Sheet 2.

J. T. WELLS.
ANIMAL TRAP.

No. 583,829. Patented June 1, 1897.

WITNESSES:

INVENTOR
J. T. Wells.
BY
ATTORNEYS.

UNITED STATES PATENT OFFICE.

JOB T. WELLS, OF CANDO, NORTH DAKOTA.

ANIMAL-TRAP.

SPECIFICATION forming part of Letters Patent No. 583,829, dated June 1, 1897.

Application filed February 11, 1897. Serial No. 622,908. (No model.)

*To all whom it may concern:*

Be it known that I, JOB T. WELLS, of Cando, in the county of Towner and State of North Dakota, have invented a new and Improved Animal-Trap, of which the following is a full, clear, and exact description.

This invention relates to a class of animal or bird traps which are self-setting, and has for its object to provide a trap of the designated character which possesses novel features of construction, is very simple, cheap to manufacture, and that is reliable in operation.

The invention consists in the novel construction and combination of parts, as is hereinafter described, and indicated in the claims.

Reference is to be had to the accompanying drawings, forming a part of this specification, in which similar characters of reference indicate corresponding parts in all the figures.

Figure 1:
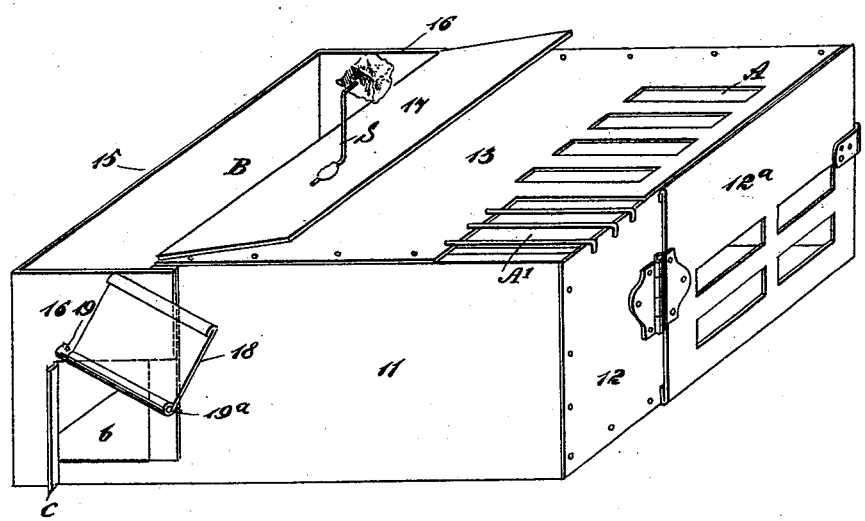
Figure 2:
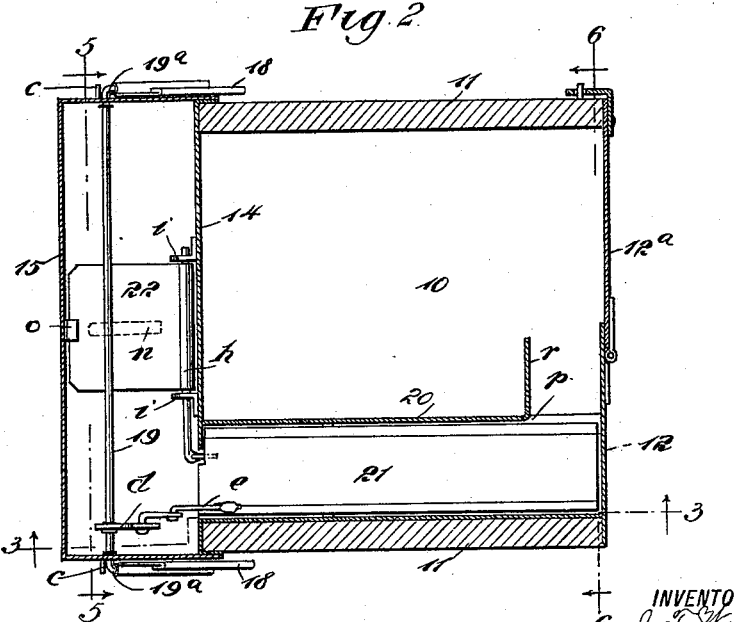
Figure 3:
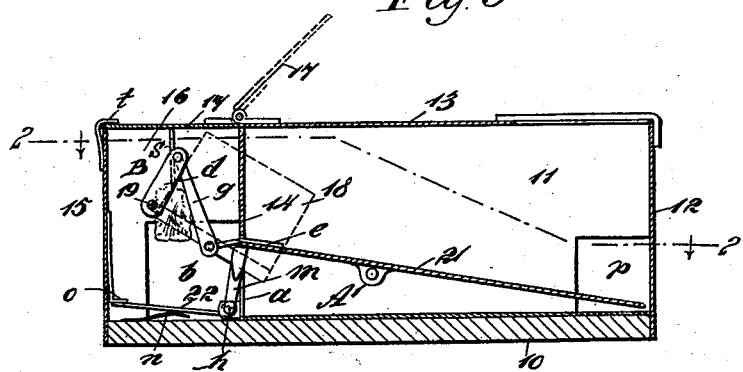
Figure 4:
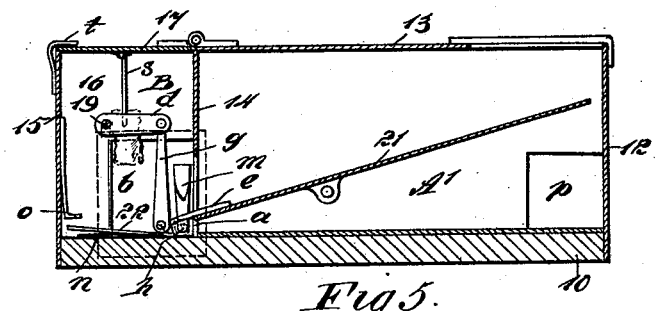
Figure 5:
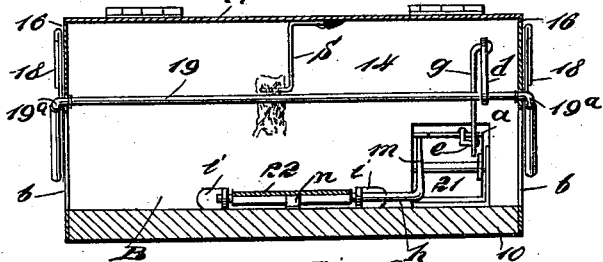
Figure 6:
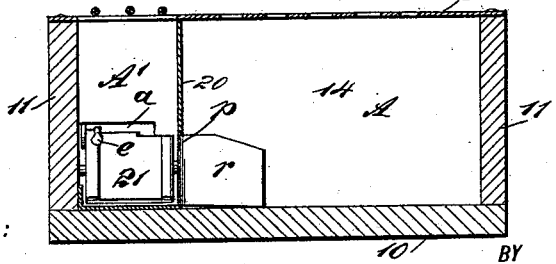

Figure 1 is a perspective view of the trap. Fig. 2 is a sectional plan view substantially on the line 2 2 in Fig. 3. Fig. 3 is a sectional side view, essentially on the line 3 3 in Fig. 2, showing the trap set. Fig. 4 is a sectional side view on the same line with Fig. 3, representing the trap closed. Fig. 5 is a transverse sectional view substantially on the line 5 5 in Fig. 2, and Fig. 6 is a transverse sectional view essentially on the line 6 6 in Fig. 2.

In the drawings representing an embodiment of the features of improvement, 10 indicates the base-board of the rectangular cage that is the trap-body. On the bottom or base board 10 two parallel walls 11 are erected along opposite edges of said base-board and have a less length than the latter. At the ends of the side walls 11, which are flush with one transverse edge of the base-board 10, an end wall 12 is secured having a suitably-sized aperture therein which is normally closed by the door 12ª, which may be hinged at one end to the cross-wall 12 and have a catch at the opposite end to hold it in a closed condition.

The trap-body proper is covered by a top plate or wall 13, that is secured upon the side walls 11, and said top wall, as well as the door 12ª, may be apertured to afford light within the inclosure A, wherein the trapped animals are caged, and also permit an inspection of the interior. A cross-wall 14 is secured on the opposite ends of the side walls 11, which wall is apertured, as at $a$, near one of the side walls 11. At the transverse edge of the base-board 10 that is nearest the cross-wall 14 a transverse wall 15 is erected, and short side walls 16 extend from the ends of the wall 15 to be secured upon adjacent ends of the side walls 11, as is clearly shown in Fig. 2.

The top wall 13 and the transverse walls 12, 14, and 15, as well as the short side walls 16, are preferably formed of sheet metal; but the base-board 10 and side walls 11 may, if preferred, be constructed of wood and are represented as made of said material. The space B, bounded by the walls 14, 15, and 16, is covered by a securable lid 17, that is hinged on the wall 13, and when folded flat forms an extension of said wall, covering what is termed a "transverse gangway" that is rendered open at each end by an aperture $b$, formed in each short side wall 16, which apertures are directly opposite and preferably are of rectangular contour.

The apertures $b$ are adapted for closure by two gates 18, which are secured along one side edge of each gate upon depending arms 19ª, that are formed on the ends of the rock-shaft 19, which extends lengthwise of the gangway B, and is journaled in the short side walls 16. The connection of the gates 18 to the arms 19ª, as explained, disposes the weight of said gates at the same side of each arm, and the relative arrangement of these connected parts is such that the gates will hang over the rectangular apertures $b$, if they are permitted to do so. At the side edge of each aperture $b$, toward which the gates 18 swing when closing, an abutment, which may be a short flange $c$, outwardly projects. Said abutments check the rocking movement of the gates and hold them upright over the apertures they are designed to close when the trap is sprung.

A longitudinally-extending partition 20 divides the inclosed space A into two compartments, the narrow compartment A' thus produced being virtually an angular continuation of the gangway B, as the aperture $a$ in the transverse wall 14 is opposite said compartment. In the compartment A' a tilting table 21 is pivoted slightly near the end which is close to the wall 14. On the rock-shaft 19 a rock-arm *d* is secured by one end and projects toward the transverse wall 14. On the tilting table 21, near the aperture *a* in the wall 14, an arm *e* is affixed so as to project one end through the aperture *a* into the gangway B, and said end is pivoted to the lower end of a link *g*, that is pivoted at its upper end upon the outer end of the rock-arm *d*.

The construction and disposition of parts, as described, adapt the weight of the gates 18, arms 19ª, rock-arm *d*, and link *g* to depress the end of the tilting table 21 that is nearest to the gates when the latter are permitted to rock into the vertical position indicated by dotted lines in Fig. 4.

At a suitable point between the apertures *b* in the walls 16 a platform 22 is supported to rock from one edge that is adjacent to the cross-wall 14 by its attachment at said edge upon the shaft *h*, that is journaled in the pair of spaced bracket-ears *i*, which project from the wall 14, as is clearly shown in Fig. 2. On the end of the shaft *h* that is nearest to the arm *e*, which projects from the tilting table, an upwardly-extended finger *m* is formed or secured.

A spring *n* is placed beneath the platform 22 and by its pressure inclines the latter upwardly at its free edge, which latter impinges upon the stop-piece *o*, that projects from the end wall 15, as shown in Fig. 3, said contact taking place when the spring is uncompressed.

A passage *p* is formed in the partition-wall 20 close to the end wall 12 of the cage, and a wing-wall *r* is preferably extended from the side edge of said aperture that is farthest from the wall 12 and is parallel therewith. From the under side of the lid 17 a bait-hook *s* is projected at a point which will locate it over the platform 22 near its center. After a suitable bait has been placed on the hook *s* the lid 17 is folded flat and secured in such adjustment by the catch *t* or like means. The pressure of the spring *n* rocks the finger *m* into the path of the tilting table at the end of the latter, which is close to the aperture *a*.

To set the trap manually, the end of the tilting table 21 that is near to the end wall 12 is pressed down into the position indicated in Fig. 3. The contact of the tilting table at its end with the finger *m* presses the latter back against the stress of the platform, actuating spring *n* until the end of the table is elevated above the upper end of the finger. Then the finger *m* rocks into normal position below the table, which is sustained thereby in elevated adjustment. The connection of the rock-arm *d* with the link *g* and the latter with the arm *e* causes the rock-shaft 19 to oscillate sufficiently to lift the gates 18, so as to open a clear passage into and out of the gangway B when the tilting table is adjusted, as shown in Fig. 3.

The animal—such as a mouse, for example—that approaches the trap at one opening *b*, when the gates 18 are raised, plainly sees the exposed bait hanging above the platform 22, and as the compartment A' below the tilting table is rendered dark by the adjustment of said table the rodent will be induced to enter the well-lighted gangway and approach the bait. The width of the platform 22 is so proportioned that the mouse must tread upon it to reach the bait if entrance is made through either opening *b* into the gangway. The depression of the platform 22 by the imposed weight of the animal rocks the shaft *h* and finger *m*, so as to remove the latter from beneath the end of the tilting table 21, which will release the gates 18, so that they may fall by gravity into a vertical position and close the apertures *b* in the side walls 16. The alarmed rodent now seeks to escape, and as the table 21 leads toward the light which enters slits in the top wall 13 the mouse ascends the inclined table, which tilts when the weight of the animal passes forward of the pivots that supports said table, so that the latter is then oppositely inclined, assuming the position shown in Fig. 3. The rodent can now enter the lighted compartment A of the trap through the passage *p* and will naturally do so; but should retreat therefrom be attempted up the table 21, which is now propped at the orifice *a* by the finger *m*, escape through the aperture is prevented.

It will be seen that the passage of the rodent or other animal into the compartment A of the trap effects the resetting of the trap, so that the catching of vermin may continue as long as mice will enter the gangway B and depress the platform 22.

Having thus described my invention, I claim as new and desire to secure by Letters Patent—

1. The combination with a trap-body or cage having a gangway at one end, a side passage connecting the cage and gangway, and two rockable gates that when pendent close the ends of the gangway, of a tilting table, a rockable platform, a device extending from the pivot-support of the platform to engage one end of the tilting table, and means connecting the gates and platform, that adapt the movement of said platform to control the gates and tilting table, substantially as described.

2. The combination with a trap-body or cage having a transverse gangway at one end, and a narrow compartment at one side connecting the cage and gangway, of two gates mounted on the ends of a rock-shaft and adapted when pendent to close the ends of the gangway, a tilting table located in the side compartment, a connection between the said rock-shaft and one end of the said table, whereby when the said end of the table is elevated, the rock-shaft will be oscillated to lift the gates, and a rockable spring-pressed platform in the gangway, the said platform being provided with means for engaging and supporting the end of the tilting table when the latter is elevated, the depression of the said platform releasing the end of the table and permitting the gates to fall by gravity, and the table to tilt, substantially as described.

3. The combination, with a trap-body or cage having a transverse gangway at one end, and an apertured longitudinal partition in the cage forming a narrow compartment at one side thereof, of a tilting table pivoted in the narrow compartment and guarding the passage from the gangway into the cage, a spring-pressed platform attached at one edge on a rockable shaft, a finger on said shaft adapted to support one end of the tilting table elevated, a rock-shaft journaled in the gangway end walls, a gate secured on an angular bent arm at each end of the rock-shaft and adapted to close the ends of the gangway, a rock-arm on the rock-shaft, an arm on the end of the tilting table nearest to said rock-arm, and a link pivotally connected to the arm of the table and the rock-arm on the shaft, substantially as described.

JOB T. WELLS.

Witnesses:
 W. E. PEW,
 MARTIN ICE.